Figure 8:
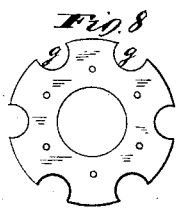

(No Model.) 4 Sheets—Sheet 1.
E. THOMSON.
DIRECT ELECTRIC WELDING MACHINE.
No. 385,386. Patented July 3, 1888.
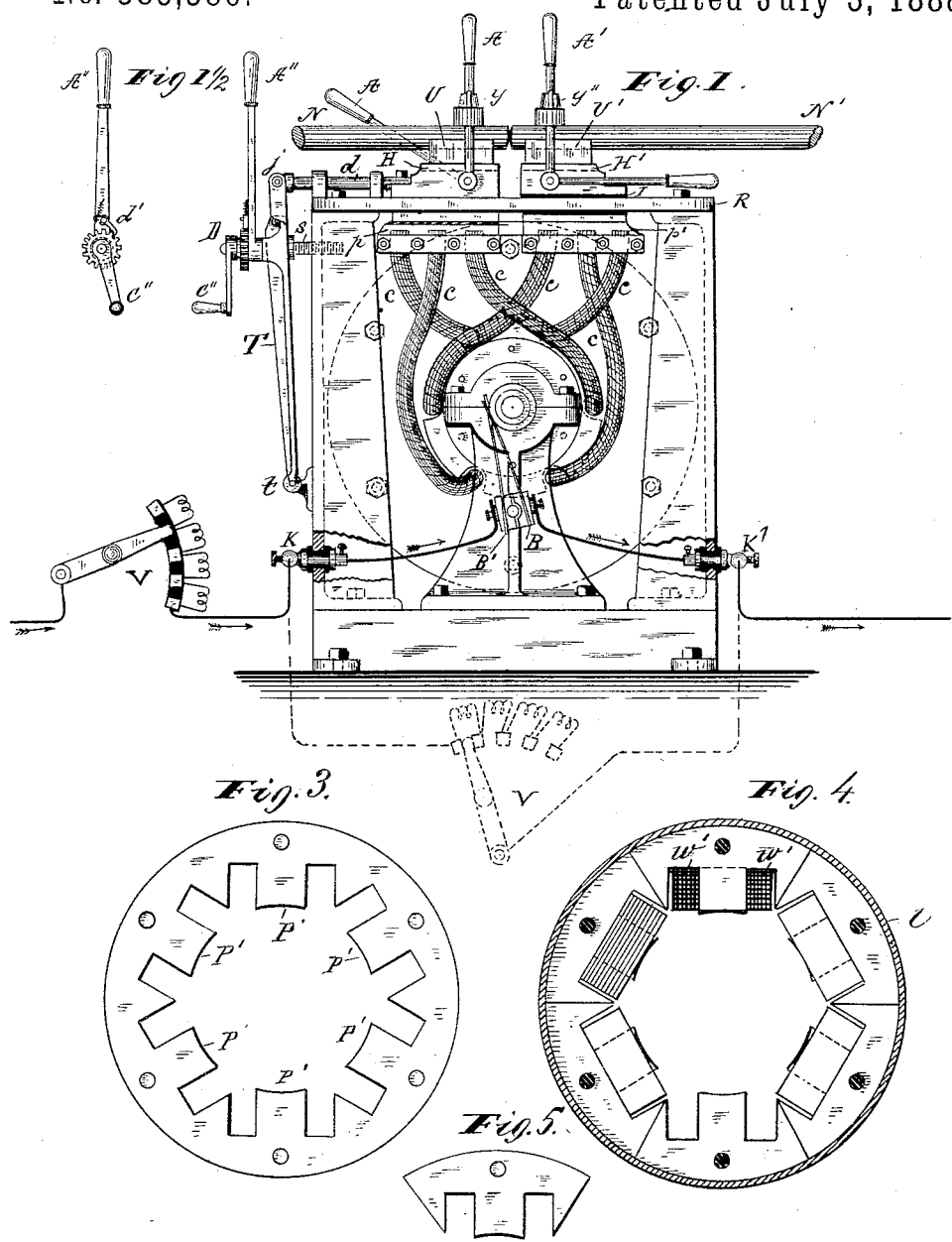
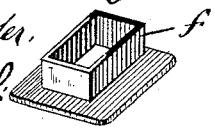
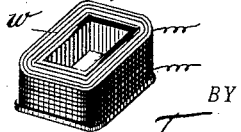
WITNESSES:
INVENTOR,
Elihu Thomson
BY
Townsend &c. Arthur
ATTORNEY.

(No Model.) 4 Sheets—Sheet 2.
E. THOMSON.
DIRECT ELECTRIC WELDING MACHINE.
No. 385,386. Patented July 3, 1888.
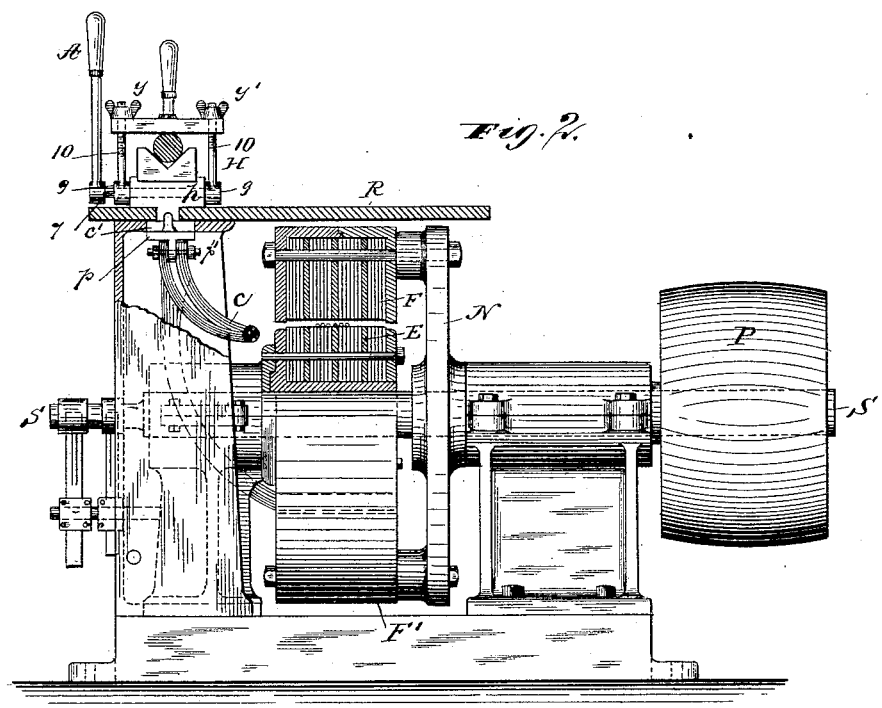
Fig. 2.
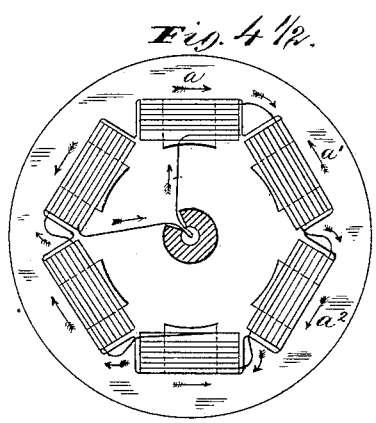
Fig. 4½.
WITNESSES:
Gabriel J. W. Galster
Wm H. Capel
INVENTOR,
Elihu Thomson.
BY
Townsend MacArthur.
ATTORNEY.

(No Model.) 4 Sheets—Sheet 3.

E. THOMSON.
DIRECT ELECTRIC WELDING MACHINE.

No. 385,386. Patented July 3, 1888.

WITNESSES:
Gabriel J. W. Galster
Wm H. Capel

INVENTOR
Elihu Thomson
BY
Townsend & MacArthur
ATTORNEYS.

(No Model.) 4 Sheets—Sheet 4.
E. THOMSON.
DIRECT ELECTRIC WELDING MACHINE.
No. 385,386. Patented July 3, 1888.
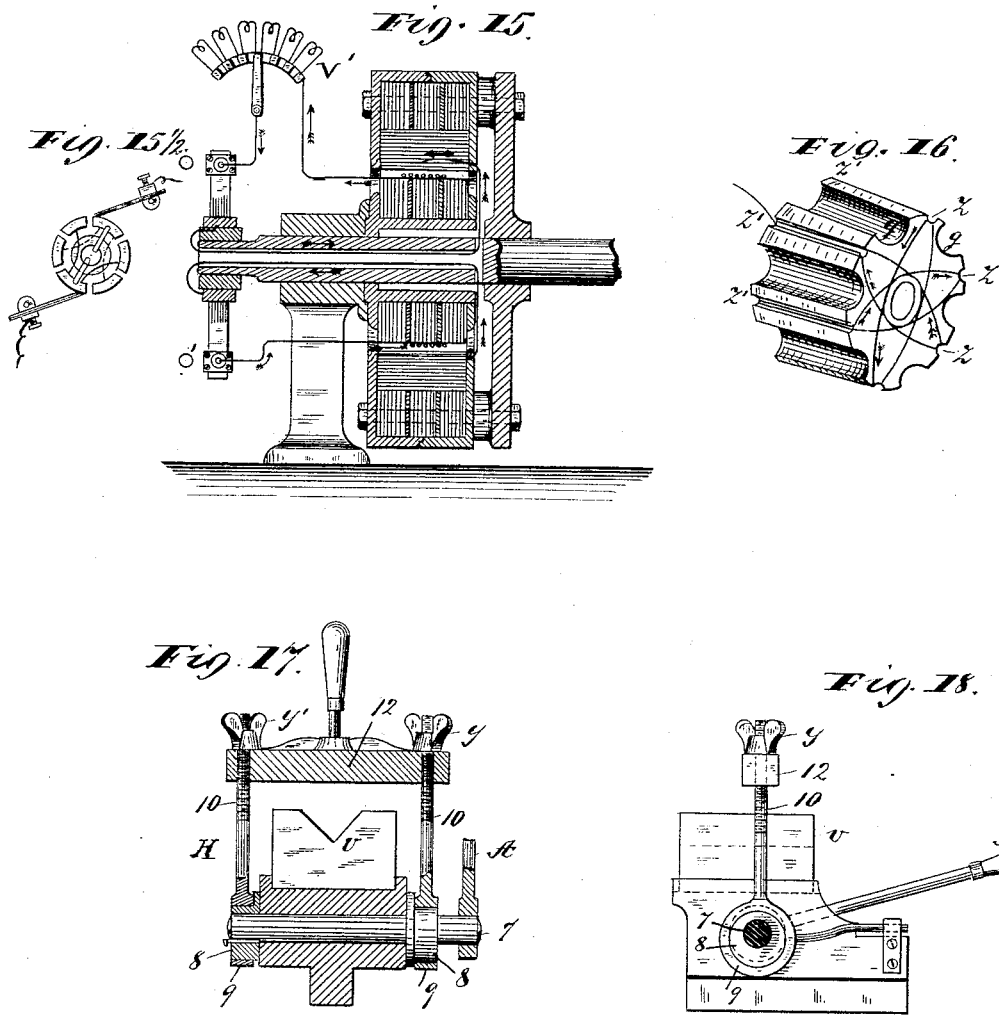

UNITED STATES PATENT OFFICE.

ELIHU THOMSON, OF LYNN, ASSIGNOR TO THE THOMSON ELECRIC WELDING COMPANY, OF BOSTON, MASSACHUSETTS.

DIRECT ELECTRIC WELDING-MACHINE.

SPECIFICATION forming part of Letters Patent No. 385,386, dated July 3, 1888.

Application filed October 17, 1887. Serial No. 252,564. (No model.)

*To all whom it may concern:*

Be it known that I, ELIHU THOMSON, a citizen of the United States, and a resident of Lynn, in the county of Essex and State of Massachusetts, have invented certain new and useful Direct Electric Welding-Machines, of which the following is a specification.

My invention relates to certain improvements in apparatus for the welding of metals by the aid of heavy electric currents.

In Letters Patent No. 347,140 I have described a method of and apparatus for electric welding, the apparatus consisting, essentially, of a means for holding the pieces to be welded, a source of current connected therewith, and means of producing pressure on the pieces, so that they may be forced tightly together to perfect the union between them; and in an application for patent filed by me May 21, 1886, Serial No. 202,842, I have described the novel process of electric forging, in which the piece of metal to be forged, bent, or shaped is heated by the passage of a heavy electric current.

In my former patents on "electric welding," and in my application aforesaid, I have assumed that current is derived from a source external to the welding apparatus—such as an alternating-current dynamo—which current, by means of a suitable induction-coil, generates heavy currents adapted for welding. This kind of welding or forging apparatus is useful in places where alternating currents can be supplied conveniently; but will not be of use in places where such currents cannot be obtained, and for this reason I have invented the following improvement in apparatus for electric welding, which consists, essentially, in the combination of suitable clamping devices for holding the pieces to be welded in the desired positions, and a dynamo for producing electric currents and forming part of the same apparatus, which I term "direct electric welding or forging machines," in contradistinction to the apparatus requiring currents from a source external to itself.

My invention consists, briefly, in the combination, with a dynamo-electric generator, of suitable clamping devices for holding the pieces to be welded in the desired position, and means for conducting the currents directly to the clamping devices, which are mounted on the frame of the apparatus.

My invention also consists in the construction of particular forms of such apparatus, and of parts and details of the same, which will be hereinafter fully described.

The many special and useful advantages of my invention are obvious. Some of them may be mentioned. Its compactness renders it easily movable from place to place; the direct combination of a dynamo-electric generator with clamping devices for holding the pieces to be operated upon renders the machine convenient in form and easy of manipulation and regulation; it generates its own welding-current—a condition absolutely essential where electric currents cannot be obtained. It may be noticed, further, that there is a saving of weight and at the same time a saving of current, for the reason that long conductors are not needed to convey the current from the electric generator to the holding-clamps.

Other advantages incident to the preferred form of my apparatus, as hereinafter described, will be mentioned at the end of this specification.

Figure 9:
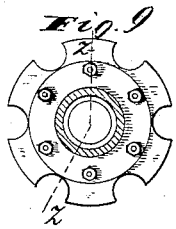
Figure 12:
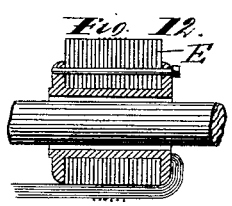
Figure 10:
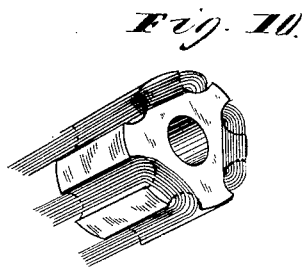
Figure 11:
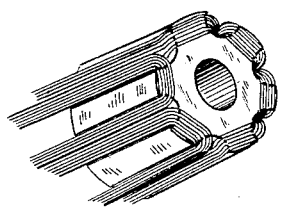
Figure 13:
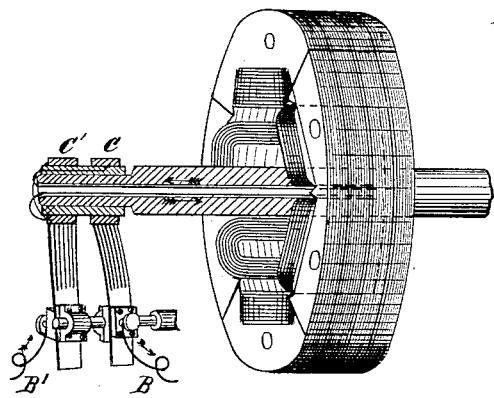
Figure 14:
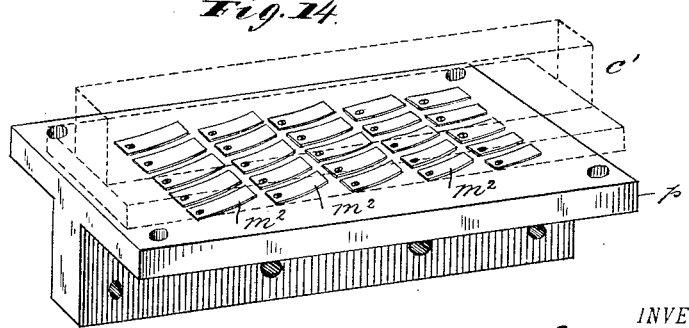

In the accompanying drawings, Figure 1 is a front elevation of a convenient form of my improved direct electric welding-machine. Fig. 1½ shows a detail of construction. Fig. 2 is a side elevation of the same apparatus, showing a partial section of the field-magnets and armature and an end view of the holding-clamps. Figs. 3 and 4 show the field-magnets, respectively, unwound and wound. Fig. 4½ shows manner of winding field-magnets. Figs. 5 and 6 show details of the construction of the field-magnets, and Fig. 7 shows detail of winding. Fig. 8 is a view of the laminated core of the armature. Fig. 9 is an end view of the armature unwound. Figs. 10 and 11 show two forms of armature-windings in perspective, Fig. 12 showing one of these windings in section. Fig. 13 is a perspective view of the connections between the field-magnet-exciting-circuit and the field-magnets. Fig. 14 is a perspective view of the form of contact-plate which conveys the welding-current from the armature-cables by a sliding contact to the moving holding clamp or clamps. Fig. 15 is a view in section of the connections between the exciting-armature coils and the field-coils. Fig. 16 is a perspective view of the manner of winding the exciting-coils on the armature. Fig. 15½ shows a form of commutator that may be used in collecting the exciting-currents of a self-exciting direct-welding machine. Fig. 17 shows in a partial vertical section one of the clamps. Fig. 18 shows the same clamp in side elevation detached from the machine. Fig. 19 is a perspective view of an eccentric employed for tightening the clamp, as will be hereinafter described.

In my direct-welding machine it is essential to use a dynamo-electric generator which is capable of producing welding-currents of great volume, but low electro-motive force between the clamps holding the pieces, and I have found a convenient form of such machine to consist of a revolving field-magnet built up of laminated cores bolted firmly together and copper-wire bobbins, producing alternate north and south poles, and an armature with laminated iron core wound with heavy copper-wire bundles or cables. The field-magnet of such a machine can be either separately excited or may be excited by currents generated in its own armature and commuted by a suitable commutator placed on the revolving field-magnet shaft of the machine.

Referring to Fig. 2 of the accompanying drawings, F is a part section view of the field-magnet core, showing lamination, F' being a part side view of the complete field. The core is fastened by means of lugs and bolts to a disk or plate, N, fixed on the shaft S S' of the machine, and is made to revolve by the pulley P.

Fig. 3 shows the form of the laminæ composing the field-magnet core, which laminæ may be made in sections, as shown in Fig. 5. When built in this way, the field-magnet is held together by an iron or other metal casing, such as is shown in section at 1 in Fig. 4.

While I describe the field-magnet core of my direct welding-machine to be built up of laminæ, I do not limit myself to this form. The field-magnet cores may be solid; but such an arrangement is attended with loss of energy, and is therefore not so economical as a laminated field-core.

Referring to Fig. 3 again, the projections P' P' P' are the poles of the field-magnets, over each of which is placed a bobbin wound with copper wire, as $w$ in Fig. 7. The form of the carrier or support of the bobbin is shown in Fig. 6. The completed field-magnet is shown in Fig. 4, the wound bobbin, Fig. 7, being shown in section at $w'$ $w'$, Fig. 4. The wire is wound on the bobbins in the manner well understood in the art, so that when a current flows through said bobbins the poles are alternately north and south. The coils are shown in the figure as connected in series; but any other manner of connecting the coils may be employed.

The two terminals of the field-magnet winding are brought through a hole in the field-magnet shaft and connected with the collector-rings C C', as indicated in Fig. 13. The exciting-current may be generated by a separate dynamo-machine, one pole of the circuit of which is connected with the brush B', Figs. 1 and 13, resting on the collector-ring C', Fig. 13, which is connected with one end of the field-magnet winding, the other pole of which circuit is connected with the brush B, resting on the collector-ring C, which is connected with the other end of the field-magnet winding. The strength of the magnetic field may be regulated by a variable resistance, V, Fig. 1, placed in the field-coil circuit, where the source of current has a definite electro-motive force. If the exciting-current is constant, the variable resistance should be omitted or used in shunt to the field-coils, or to the posts K K' of the machine, as indicated.

Other well-known means of regulating the strength of the field-magnet may also be employed.

The armature of my direct-welding machine may be made in the following way.

Referring to Fig. 2, E represents a part sectional view of the laminated iron core of the armature, the lamination being represented by fine vertical lines. These laminæ are bolted firmly together, as indicated in the figure. The form of the laminated cores is shown in Fig. 8 and the manner of bolting them together is shown in end view in Fig. 9. There are as many grooves $g$ $g$, Fig. 8, in the armature-core as there are bobbins in the field-magnet. These grooves are wound with heavy copper conductors or cables, consisting, preferably, of a number of insulated copper wires. This winding is represented in Fig. 10, and it may be varied, as in Fig. 11, where the cables divide, one half the wires forming them going around to the groove on the left, the other half to the groove on the right, as indicated.

The special advantage of winding the armature with conductors or cables consisting of a number of copper wires insulated from each other is that the insulation prevents lateral contact of the wires, and therefore prevents the generation of the intense eddy-currents which would otherwise be produced. In this way considerable waste is avoided.

The dynamo-machine, constructed preferably in the manner before described and in such way as to generate the heavy electric currents suitable for electric welding or forging, is mounted upon a suitable base or frame, as indicated.

Mounted upon a frame in direct proximity with the dynamo-machine and preferably constituting a part of the frame or base carrying said machine are the holding-clamps to be used in the welding or forging operations, and with these clamps connection is made directly from the part of the dynamo generating the heavy electric currents. By thus combining the clamps and the dynamo-machine the use of flexible or extended connections may be entirely avoided, and the electrical connection may, if desired, be a rigid one. I prefer, however, to make the connection from the dynamo to the clamp as follows: The armature conductors or cables, leaving the fixed armature, are bolted firmly against the contact-plates $p$ $p'$, Fig. 1, which convey the welding-currents to the holding-clamps H H'.

In Fig. 1 three separate armature-coils—such as shown in Fig. 10—are supposed to be employed. Of the six terminals, the three which at any time are of one polarity—say positive—are connected to one of the plates $p$ $p'$, while the remaining three are connected to the other plate. By the multiple-arc connection shown a current of very large volume is obtained. By revolving the field heavy currents of low potential are induced in the armature-conductors $c\ c\ c$, which are bolted firmly against the contact-plates $p\ p'$, Figs. 1 and 14, in the manner shown at $p''$ in Fig. 2. One of the holding-clamps is best insulated from the table or frame R, as indicated at I in Fig. 1. This is to prevent the passage of the welding-current from the contact-plate $p'$ to the clamp H by the frame R.

A front view of the holding-clamps H H' is shown in Fig. 1, and an end view of one of them, H, in Fig. 2. They are made of heavy pieces of metal, so that they may conduct the large welding-currents to the pieces to be welded and be sufficiently strong to allow considerable endwise pressure to be brought to bear on the pieces without danger of their slipping or bending. The clamps should be preferably of a form which will fit closely the pieces to be welded, so as to insure good contact, though comparatively small contact will often suffice to carry currents heavy enough to weld large pieces. Arrangements can also be made to allow free movement of one or both of the clamps.

Referring to the drawings, in Figure 1, H' is a front view of one of the clamps, which is bolted firmly to the plate $p'$, and is therefore immovable. The other clamp, H, is movable, receiving its motion by the device D $d$. The bar $d$ is bolted to H, but has a free movement about $j$, where it is loosely connected with a pivoted bar, T, pivoted at $t$. A screw-spindle, $s$, passes through a screw-hole in T, after the manner of a screw-vise, and is provided at its other end with a ratchet-wheel, with which a pawl, $d'$, is adapted to engage. When the lever A'', carrying pawl $d'$, is brought down to a lower position, the pawl $d'$, Fig. 1½, acts to turn the screw $s$, which forces $d$, Fig. 1, and the clamp H toward H', this motion being rendered possible by the free movements of $d$ about $j$ and T about $t$, and the sliding contact of H with the plate $p$. This sliding contact is represented in Fig. 14, though a plain sliding contact will often suffice. The clamps H H', Fig. 1, are tightened about the pieces N N by means of the levers A A'. These levers are secured to suitable rock-shafts, 7, mounted in the base of the clamp and provided with eccentrics 8, as indicated more clearly in Figs. 17, 18, and 19. The eccentrics 8 are embraced by collars 9, formed on the lower end of the rods 10, which pass at their upper ends through the top plate, 12, of the clamp, and are there provided with the clamping ends $y\ y'$.

Fig. 17 is an end view, partly in section, of the movable clamp H, showing the removable piece U, the screws $y$ and $y'$, and the lever A. The piece 12 is moved down tightly upon the piece of metal to be welded by the screws $y\ y'$, and the lever A is brought down, tightening the hold of the clamp upon the piece by the eccentrics 8.

The form of the eccentric is given in Fig. 19.

The welding-current is carried to the movable clamp H, Fig. 1, by the plate $p$, which has a sliding contact with H, as represented in end view in Fig. 2. The plate $c'$ is bolted to the block $h$, which forms the base of H, and thus brings the clamp H into contact with $p$, to which half the conductors $c\ c\ c$, Fig. 1, are attached.

In order to form a good connection from the plate $p$ to the clamp H, one or the other of the plates $p\ c'$ is provided with a gang of contact-springs, $m^2$, as shown in Fig. 14. By these springs good connection is formed, while at the same time permitting the one plate to slide upon the other in the manipulation of the clamp.

Although the form of machine just described is convenient and efficient, yet modifications may be made in it to suit varying conditions, and I do not limit myself in my invention to the particular form described. The form of direct-welding machine just described may be made self-exciting by winding a sufficient number of turns of wire of suitable size in grooves cut in the armature-core for that purpose and connecting the terminals of these coils with commutator-brushes resting against a suitable commutator placed on the revolving field-magnet shaft of the machine, which suitable commutator is connected with the field-coils of the machine. In order more clearly to explain this arrangement, I represent an armature wound with exciting-coils, two in each groove, in Fig. 16. The grooves $g\ g$, as was explained in describing Figs. 8, 10, and 11, are for the cables that carry the welding-currents. The grooves $z\ z$, as will be seen, are for the coils that carry the exciting-current.

The exciting-coils are preferably wound in the following manner: Starting with, say, the top groove, Z, Fig. 16, two or more turns are made with a left-handed rotation completely around the armature and filling the groove, if need be; then taking the next groove on the right, similar complete turns with right-handed rotational direction are made, and the next groove, or second groove to the right, is then taken, and similar complete turns from right to left are made, which completes the winding and leaves two free terminals. The six spaces thus have received wire which has been applied in the first pair of diametrically-opposite grooves in a certain direction, and in the next pair to the right in the direction opposite to the direction of the first turns, and in the third pair to the right in a direction opposite to the turns in the second set, or the direction of the winding is opposite in the grooves as we proceed in any direction around the armature. The terminals are connected in the usual manner with the alternate segments of the commutator, three segments to each terminal. This winding is capable of modifications, and is substantially the well-known old Siemens H armature-winding multiplied, since the terminals are alternately positive and negative.

Fig. 15 is a view in section of the connections between the exciting-armature coils, the commutator-brushes O O', and the variable resistance V', which is thrown in to regulate the strength of the magnetic field.

Fig. 15½ shows a six-part commutator with brushes to be used on a machine with a six-pole field-magnet. Of course for every extra pair of coils in the field-magnet there must be two extra segments in the commutator.

In the arrangement above described the exciting-coils on the armature are wound in series; but I do not limit myself to series-winding. By using wire of proper size the exciting-coils may be wound in multiple, and by changing the size of the wire to suit the conditions the coils may be wound in multiple series. Arrangements to suit these conditions are well known to practical electricians, and need not further be dwelt upon here. It is also well known that such coils may be wound in series or on the core in several different ways, and the same is true of multiple-arc winding and of winding in series multiple.

In both of the arrangements herein described it will be observed that there is an absence of any commutator or collecting device between the dynamo-machine source and the clamps of the apparatus, so that there is no break of continuity in the path of the heavy electric currents. This is a very important consideration in an apparatus for this purpose, and is attained by the apparatus described in my prior patents, where I have set forth the employment of an induction-coil wound so that current of comparatively high tension on one circuit may generate the heavy or larger volume currents in a secondary wire, which is directly connected without the intervention of any commutator or collector with the clamps.

Still other arrangements and modifications may be made in my direct electric welding-machine, and I do not limit myself in my invention to the apparatus described, but claim, broadly, the invention of a welding-machine which consists of a suitable dynamo-machine for generating electric currents of great volume, in combination with holding-clamps and devices for moving or manipulating the same, the whole forming one compact apparatus.

What I claim as my invention is—

1. A direct electric welding or forging machine or apparatus consisting of a dynamo-generator constructed to generate currents of great volume, and suitable clamps or holding devices connected with the part of the machine in which the heavy currents are generated, said devices being all mounted in a proper frame and in convenient proximity to one another, as and for the purpose described.

2. A direct welding or forging apparatus consisting of a dynamo-generator having a stationary armature, suitable clamps or holding devices for holding the work, and direct electrical connections from the terminals of the armature-coils to said clamps, as and for the purpose described.

3. The combination, in a direct electric welding-machine, of an armature-conductor in which currents are induced by the revolution of the moving parts, extensions or connections from said armature-conductor, and welding-clamps and guides or supports attached to or supported by the frame of the machine bearing said clamps.

4. In a direct electric welding or forging machine, a revolving multipolar field-magnet, in combination with a fixed armature and conductors wound thereon and connected to a set of holding and welding clamps.

5. In a direct electric welding or forging machine, a multipolar revolving field-magnet, in combination with fixed armature and conductors wound thereon, and direct connections from said conductors to a set of holding or welding clamps, one or both of which clamps are movable.

6. In a self-exciting direct electric welding or forging machine, an armature-conductor in which currents are induced by the revolution of moving parts, extensions or connections from said armature-conductors to a set of holding and welding clamps, and guides or supports attached to or supported by the frame of the machine bearing such clamps, in combination with a second and distinct armature-conductor and connections therefrom to a variable resistance, $r$, through a variable reactive coil or its equivalent to commutating devices or commutator, which commutes the currents for the excitation of the field-magnet.

7. In a dynamo electric machine for electric welding or forging, a laminated and grooved armature-core, the armature-conductors in said grooves consisting of bundles of insulated wires whose ends or terminals are connected with the welding-clamps, either directly or indirectly, which armature-conductor passes solely from one end of the armature-core to the other and back, forming thereby about one complete convolution on the core.

8. In a machine of the kind described, an armature having two sets of grooves, relatively large and small, in one of which are wound the main-circuit conductors and in the other and smaller grooves the exciting conductor or conductors for the field-magnets.

9. In a dynamo-electric machine or motor, an armature-core with two sets of grooves, large and small, alternately cut in the core.

10. In a dynamo-electric machine, a circular laminated field-magnet core made in sections, having pole-pieces pointing radially inward, in combination with an iron or other metal external ring or casing in which the sections are borne or carried, substantially as shown and described.

11. In an electric welding or forging apparatus, the combination, with one of the clamps, of a ratchet-wheel and lever and an intermediate screw-connection, as and for the purpose described.

12. The combination, in an electric welding or forging apparatus, of a movable clamp, a propelling end loosely connected therewith, a screw provided with a ratchet-wheel, and an operating-wheel having a propelling-pawl, as and for the purpose described.

13. The combination, in an electric welding or forging apparatus, with a movable portion of the clamp, of a rock bar or shaft having an attached operating-handle, one or more eccentrics secured to said shaft, and one or more collars or sleeves embracing said eccentrics and connected with a movable portion of the clamp, as and for the purpose described.

14. The combination, in an electric welding or forging apparatus, of a clamp, a base-plate, $p$, connected with a source of heavy currents, and a gang of contact-springs between said base-plate and the movable clamp, as and for the purpose described.

15. In an electric welding or forging apparatus, a self-exciting dynamo-machine having a stationary armature and a movable field-magnet, said armature being provided with two sets of conductors, one of which is connected directly with the clamps or holders of the apparatus without the intervention of conducting-rings or other moving devices, while the other armature-conductor is connected with the field-magnet of the machine through a suitable rectifying-commutator.

Signed at Lynn, in the county of Essex and State of Massachusetts, this 13th day of October, A. D. 1887.

ELIHU THOMSON.

Witnesses:
 OTIS K. STUART,
 J. W. GIBBONEY.